United States Patent
Al-Kadry

(10) Patent No.: US 11,482,827 B2
(45) Date of Patent: Oct. 25, 2022

(54) FIGURE EIGHT LASER

(71) Applicant: MPB Communications Inc., Montreal (CA)

(72) Inventor: Alaa Al-Kadry, Montreal (CA)

(*) Notice: Subject to any disclaimer, the term of this patent is extended or adjusted under 35 U.S.C. 154(b) by 0 days.

(21) Appl. No.: 17/560,450

(22) Filed: Dec. 23, 2021

(65) Prior Publication Data

US 2022/0131331 A1    Apr. 28, 2022

Related U.S. Application Data

(63) Continuation of application No. PCT/CA2021/051131, filed on Aug. 17, 2021.

(60) Provisional application No. 63/070,062, filed on Aug. 25, 2020.

(51) Int. Cl.
*H01S 3/067* (2006.01)
*H01S 3/11* (2006.01)
*H01S 3/16* (2006.01)

(52) U.S. Cl.
CPC ...... *H01S 3/06791* (2013.01); *H01S 3/06712* (2013.01); *H01S 3/06716* (2013.01); *H01S 3/06725* (2013.01); *H01S 3/1112* (2013.01); *H01S 3/1618* (2013.01)

(58) Field of Classification Search
CPC ............. H01S 3/06791; H01S 3/06712; H01S 3/06716; H01S 3/06725; H01S 3/1112; H01S 3/1618; H01S 3/1312; H01S 3/07; H01S 3/1024
See application file for complete search history.

(56) References Cited

U.S. PATENT DOCUMENTS

| | | | |
|---|---|---|---|
| 5,513,194 A | 4/1996 | Tamura et al. | |
| 6,374,006 B1 | 4/2002 | Islam et al. | |
| 2002/0106171 A1* | 8/2002 | Kim | H01S 3/06791 385/27 |
| 2005/0063425 A1* | 3/2005 | Krastev | H04L 7/0075 372/6 |
| 2008/0025348 A1 | 1/2008 | Kuksenkov et al. | |
| 2010/0061407 A1 | 3/2010 | Nicholson | |
| 2016/0204565 A1* | 7/2016 | Barre | H01S 3/1062 372/6 |
| 2019/0356106 A1* | 11/2019 | Nicholson | H01S 3/06725 |

OTHER PUBLICATIONS

International application No. PCT/CA2021/051131 International Search Report dated Nov. 15, 2021.
International application No. PCT/CA2021/051131 Written Opinion of the International Searching Authority dated Nov. 15, 2021.
Zhao et al., High-power figure-of-eight fiber laser with passive sub-ring loops for repetition rate control. Optics Express. vol. 14, Issue 22, pp. 10475-10480. Oct. 30, 2006. https://doi.org/10.1364/OE.14.010475.

(Continued)

*Primary Examiner* — Xinning (Tom) Niu
(74) *Attorney, Agent, or Firm* — Anglehart et al.

(57) ABSTRACT

A figure-8 laser is configured in which gain in the uni-directional loop can be removed while maintaining mode-locked operation with gain only in the bi-directional non-linear amplifying loop. Simplified self-starting and control over pulse characteristics by controlling gain in the bi-directional loop is made possible.

32 Claims, 8 Drawing Sheets

(56) References Cited

OTHER PUBLICATIONS

Corresponding international patent application No. PCT/CA2021/051131 supplementary international search report dated Jun. 23, 2022.
Nicholson J W et al., 91 fs pulses from an Yb-doped figure-eight fiber-laser dispersion compensated with higher-order-mode fiber. Conference on Lasers and Electro-Optics/Quantum Electronics and Laser Science Conference and Photonic Applications Systems Technologies OSA Technical Digest Series (CD) (Optica Publishing Group, 2007), paper CMU3. May 6, 2007. pp. 1-2.
Claude Aguergaray et al., Mode-locked femtosecond all-normal all-PM Yb-doped fiber laser using a nonlinear amplifying loop mirror. Optics Express vol. 20, Issue 10, pp. 10545-10551 (2012) •https://doi.org/10.1364/OE.20.010545.
M. Nishiura et al., 1020-1064 nm wavelength-tunable all polarization maintaining mode-locked fiber laser with a programmable optical filter. Proceedings vol. 11260, Fiber Lasers XVII: Technology and Systems; 112600T (Feb. 21, 2020) https://doi.org/10.1117/12.2541864.
Hao Qiang et al., Self-Started Mode-Locking With Dispersion-Imbalanced Nonlinear Amplifier Loop. IEEE Photonics Technology Letters, IEEE, USA, vol. 28, No. 1. Jan. 1, 2016. pp. 87-90.

\* cited by examiner

FIGURE EIGHT LASER

CROSS-REFERENCE TO RELATED APPLICATIONS

This patent application is a continuation application of International PCT application No. PCT/CA2021/051131 filed Aug. 17, 2021 designating the United States, that claims priority to U.S. provisional patent application 63/070,062 filed Aug. 25, 2020, the contents of which are hereby incorporated by references.

TECHNICAL FIELD

The present description relates to mode-locked fiber lasers.

BACKGROUND

Ultrashort-pulse fiber lasers are compact, stable, and play dominant roles in many applications including the medical imaging fields and other major industries including electronics, semiconductor, and microtechnology. Ultrashort-pulse lasers help manufacture components with unprecedented quality, accuracy and speed. Owing to the short duration of pulses, the laser energy can be input to the material in a shorter time than heat can be deposited which thus prevents thermal damage to the part. In those applications, stability against environmental perturbations, such as temperature variations, stress, and humidity are a crucial aspect. By using polarization maintaining (PM) fibers and PM components, since the linear polarization state can be maintained during propagation, environmentally stable ultrashort pulse fiber lasers can be realized.

Mode-locking a laser is a well-known method for the generation of ultrashort laser pulses. The method is based on the generation of many frequencies with locked phase relations among them within a defined pulse duration. To achieve mode-locking, fiber lasers have utilized, for instance, real and artificial saturable absorber (SA) devices. Real SA devices include semiconductor SA mirrors (SESAM), single wall carbon nanotubes, and graphene, etc. These devices, however, suffer from a short-term operational life and cannot tolerate high-energy pulse operation. Artificial SA devices are more robust mode-locking mechanisms which can provide short pulse duration and long-term stable operation if implemented in an all-PM fiber laser cavity. Examples of artificial SA mechanisms include nonlinear polarization rotation (NPR), nonlinear optical loop mirrors (NOLM) and nonlinear amplifying loop mirrors (NALM). Despite the advantages of the artificial SA devices, these devices have their own limitations.

The NPR mechanism restricts its use to non-PM cavities and suffers from environmental perturbations and mechanical vibrations. As a consequence, the output pulse characteristics from these systems may be irreproducible. NOLM and NALM devices operate using the same general principle, i.e. a Sagnac interferometer. These devices are constructed from a fused coupler whose output ports are spliced together to form a loop. In the loop, the light propagates with unequal intensity in the counterclockwise and clockwise directions. This can be achieved either by making the coupler splitting ratio unequal (NOLM) or by the inclusion of an in-line fiber amplifier closer to one of the ports of the coupler (NALM). In both cases, the other two ports of the fused coupler are spliced to the ends of an optical fiber train to form a uni-directional loop, connected to the bi-directional non-linear loop mirror by the fused coupler. In comparison with NOLM, the NALM improves the self-start mode-locking capability of the laser by providing strong loop asymmetry.

For a long time, figure-8 fiber lasers (NOLM- or NALM-based) lacked reliable self-start mode-locking unless additional intra-cavity amplitude modulators were added in the loop mirror. If no amplitude modulators were used, a reliable self-start could only be achieved by optimizing the cavity loss and the coupling ratio of the 4-port coupler connecting the two loops (uni-directional and bi-directional) of the figure-8 fiber laser. Optimizing the laser design would mean carefully choosing each and every element comprising the laser cavity, which creates great challenges for industrial applications. Once single-pulse operation is achieved, the parameters of the pulse (i.e. energy, spectral bandwidth, duration) can be simply adjusted by varying the pump power of the single gain element of the laser.

The problem of reliable self-starting was solved in NALM-based fiber lasers by incorporating an additional gain element in the uni-directional loop (i.e. two gain elements in the laser cavity). However, solving the reliability of self-starting came at the expense of increasing the complexity of the system design. It has been shown that the addition of a second independent amplification stage in the uni-directional loop allows the adjustment of the nonlinearity and the compensation for losses in the laser cavity but broadly widens the possible range of the generated pulse parameters (i.e. energy, spectral bandwidth, duration, and degree of coherence).

The first demonstration of NALM-based figure-8 fiber lasers—having one independent gain element in each loop—consisted only of fibers with normal dispersion. In a single design of such a laser cavity, pulses were generated with an order of magnitude of energy range and pulse duration, and with different degrees of coherence, by varying the ratio of the pumping powers of the two gain elements. Several reports have studied the influence of the pump power of each of the two gain elements on the output pulse parameters.

The development of new approaches to control the parameters of the generated pulses were thus required for these complex laser architectures. Machine learning and electronic control of the ratio of pumping powers were proposed as methods to control the pulse duration, pulse energy, and spectral bandwidth of the generated laser pulses. By using these methods, the laser system self-adjusts its parameters by having an optical feedback loop which links the laser performance with two or more variable cavity parameters. However, machine learning requires complex algorithms and a large set of diagnostic monitors to provide the inputs for the feedback loop, and using the ratio of pumping powers could raise problems of control over long-term laser operation as the two pumping sources could degrade differently over time. Both methods show limitations and problems for industrial applications.

Another major challenge in NALM-based and NOLM-based figure-8 fiber lasers with all-normal dispersion fibers is the establishment of a low-noise, stable-pulse regime. Dispersion-managed figure-8 fiber lasers consisting of anomalous and normal dispersion fibers present an attractive design to produce pulses with excellent ultra-low-noise performance. Depending on the net cavity dispersion, numerous pulse evolutions can take place, which lead to very different output pulse characteristics.

Figure-8 fiber lasers based on NPR, NOLM, and NALM mechanisms have been demonstrated with a large net normal cavity dispersion, with a large net anomalous cavity dispersion, and with a net cavity dispersion approaching zero. Reports have demonstrated that the best performance of output pulses, in terms of large spectral bandwidth and low timing jitter, can be achieved by managing the net cavity dispersion of the fiber laser to be approaching zero. The generated pulses in this cavity dispersion regime are called stretched pulses in the sense that these pulses are linearly chirped and can be compressed to obtain short-duration, near transform-limited pulses.

SUMMARY

In prior art figure-8 lasers, reliable mode-locked operation requires gain in both loops. Applicant has configured a figure-8 laser in which gain in the uni-directional loop can be removed while maintaining mode-locked operation with gain only in the bi-directional nonlinear amplifying loop.

Applicant has discovered that robust stable single-pulse state of operation can be reliably achieved using fixed, pre-determined pump current adjustments without performing any iterative searching or feedback-based adjustment of the pumps sources to establish the stable single-pulse state of operation.

Furthermore, with pump power providing gain in the bi-directional nonlinear amplifying loop only, pulse characteristics can be simply controlled by measuring output power and adjusting the pump power of the gain element of the bi-directional loop.

In some embodiments, there is provided a mode-locked, figure-eight fiber laser comprising a fused fiber coupler for connecting two fiber loops, a bi-directional loop connected to the coupler having a gain element and a first pump source, a unidirectional loop connected to the coupler having a gain element, a second pump source, an isolator, a filter and an output coupler. The laser is configured to operate in a stable single-pulse state of operation with the second pump at zero power. A controller connected to the first pump source and to the second pump source can be configured to drive both the first pump source and the second pump source at a high power to start a high-order multi-pulse state operation, then to drive the first pump source at a lower power to transition to a low-order multi-pulse state operation, and then to drive the second pump source at zero power to transition to a stable single-pulse state of operation.

The uni-directional loop and said bi-directional loop may be comprised of PM fibers and PM components.

The laser may comprise a length of optical fiber with opposite sign of group velocity dispersion with respect to other fiber in said laser for dispersion management, said single-pulse state of operation providing, in use, stretched pulses.

The isolator, the filter and the output coupler may comprise an optical circulator and a chirped fiber Bragg grating.

The gain element of the bi-directional loop may comprise a section of rare-earth doped fiber, for example ytterbium-doped fiber.

The gain element of the uni-directional loop may comprise a section of rare-earth doped fiber, for example ytterbium-doped fiber.

The laser may be configured wherein the net cavity group velocity dispersion is within the range of $-0.16$ $ps^2$ to $+0.15$ $ps^2$.

The laser may be configured wherein the spectral bandwidth of the filter (or CFBG) is at least 7 nm.

The laser may be configured to produce in the single-pulse state of operation output pulses having a duration at FWHM less than 15 ps.

The controller may be configured to change power levels of the first pump source and the second pump source in pre-determined increments with waiting times between subsequent increments as the power levels change from the high power to start a high-order multi-pulse state operation, then to drive the first pump source at a lower power to transition to a low-order multi-pulse state operation, and then to drive the second pump source at zero power to transition to a stable a single-pulse state of operation.

The controller may be configured to drive the second pump source at a fixed low level of power after the laser has transitioned to the stable single-pulse state of operation so as to provide greater output power, greater pulse duration, and greater spectral bandwidth from the laser.

The laser may further comprise an output power sensor, wherein the controller is configured to drive the first pump source at a level to stabilize an output power of the laser in response to the output power sensor.

The laser may be configured to produce in the single-pulse state of operation output pulses having a repetition rate higher than 5 MHz.

The laser may be configured to produce in the single-pulse state of operation output pulses having a FWHM spectral bandwidth larger than about 1 nm.

The laser may be configured to produce in the single-pulse state of operation output pulses having an average output power above 1 mW.

In some embodiments, there is provided a method for producing a stable train of laser pulses comprising:

providing a figure-8 laser having:

a fused fiber coupler for connecting two fiber loops;

a bi-directional loop connected to the coupler having a gain element and a first pump source; and a unidirectional loop connected to the coupler having a gain element, a second pump source, an isolator, a filter and an output coupler;

driving both the first pump source and the second pump source at a high power to start a high-order multi-pulse state operation;

driving the first pump source at a lower power to transition to a low-order multi-pulse state operation; and driving the second pump source at zero power to transition to a stable a single-pulse state of operation.

It will be understood that the figure-8 laser may provide simplified self-starting and control over pulse characteristics by controlling gain in the bi-directional loop.

BRIEF DESCRIPTION OF THE DRAWINGS

The invention will be better understood by way of the following detailed description of embodiments of the invention with reference to the appended drawings, in which.

DETAILED DESCRIPTION

The below-described embodiments provide passively mode-locked fiber lasers that have a reliable self-start with controllable output pulse operation. The fiber lasers are configured with a figure-8 shaped all-fiber laser ring cavity, void of free space. In one embodiment, the laser is constructed from optical components with opposite group velocity dispersion and has a net cavity dispersion close to zero (dispersion-managed cavity). In another embodiment, the laser cavity includes only components with normal dispersion (all-normal-dispersion cavity). The ring cavity in both laser embodiments includes two loops. The first loop is called the non-linear amplifying loop and the second loop is called the uni-directional loop. The fiber loops are connected with a fused coupler. The laser utilizes two amplifiers to self-start; one amplifier in the uni-directional loop and another in the non-linear amplifying loop. A control method is used to reliably initiate mode-locking of the laser, maintain mode-locking operation under environmental changing conditions, and control the lasers output pulse parameters.

Figure 8:
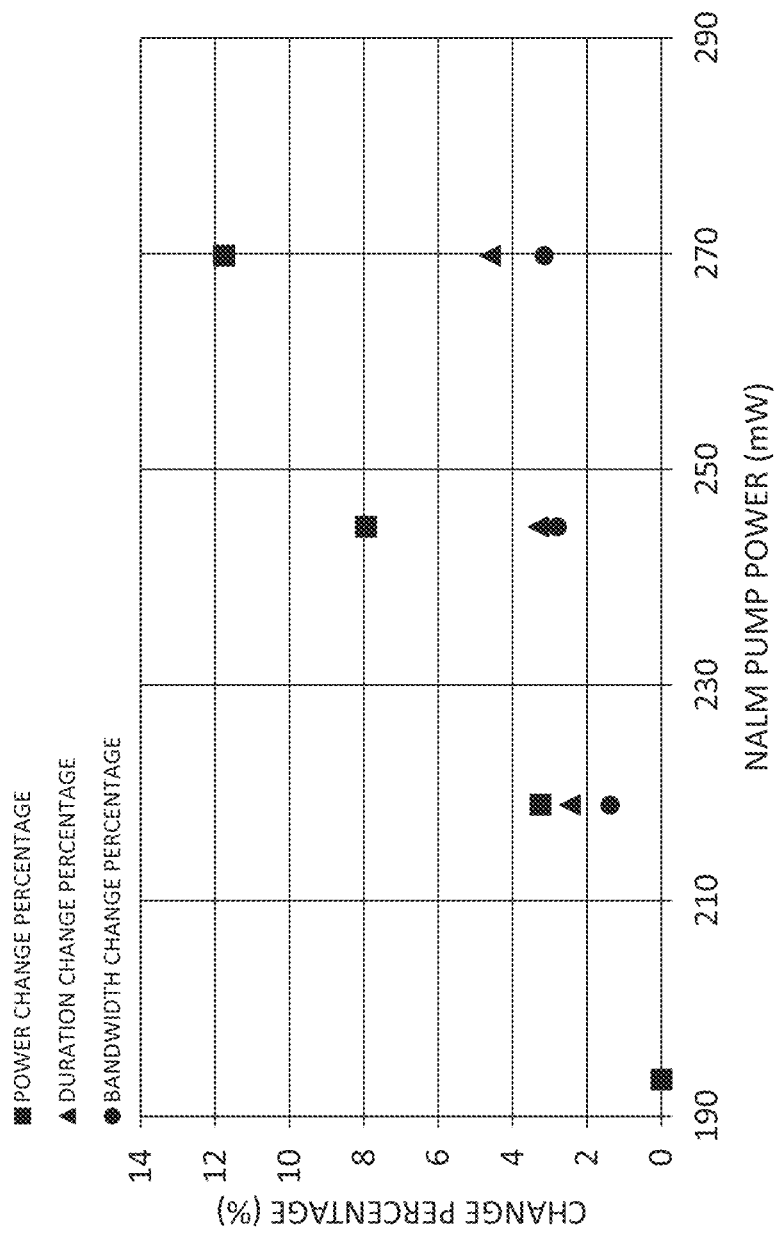
FIG. 8 is a plot of change percentage of duration, bandwidth and output power as a function of pump power for the gain segment in the bi-directional loop for the laser of FIG. 3.

The use of the novel sequential start-up and control method with the novel optimization of the figure-8 fiber laser architecture results in reliable self-start and simplifies the control of output pulse parameters of figure-8 fiber lasers. This method can be used to control dispersion-managed, all-normal dispersion, or all-anomalous dispersion figure-8 fiber lasers. Using the control method, the laser can establish stable single-pulse operation while utilizing only the amplifier located in the nonlinear amplifying loop, with the other amplifier being turned off. Operating NALM-based figure-8 fiber lasers (comprising two amplifiers) with only a single amplifier active simplifies the control of the lasers' output pulse parameters. By monitoring the output optical power, the driver current of the amplifier in the nonlinear amplifying loop can be electronically controlled such that the power inside the cavity is maintained within a certain change-percentage. By controlling the drive current of this amplifier, the nonlinearity of the amplifying loop mirror—which is important to keep the laser mode-locking—is also maintained.

Figure 1:
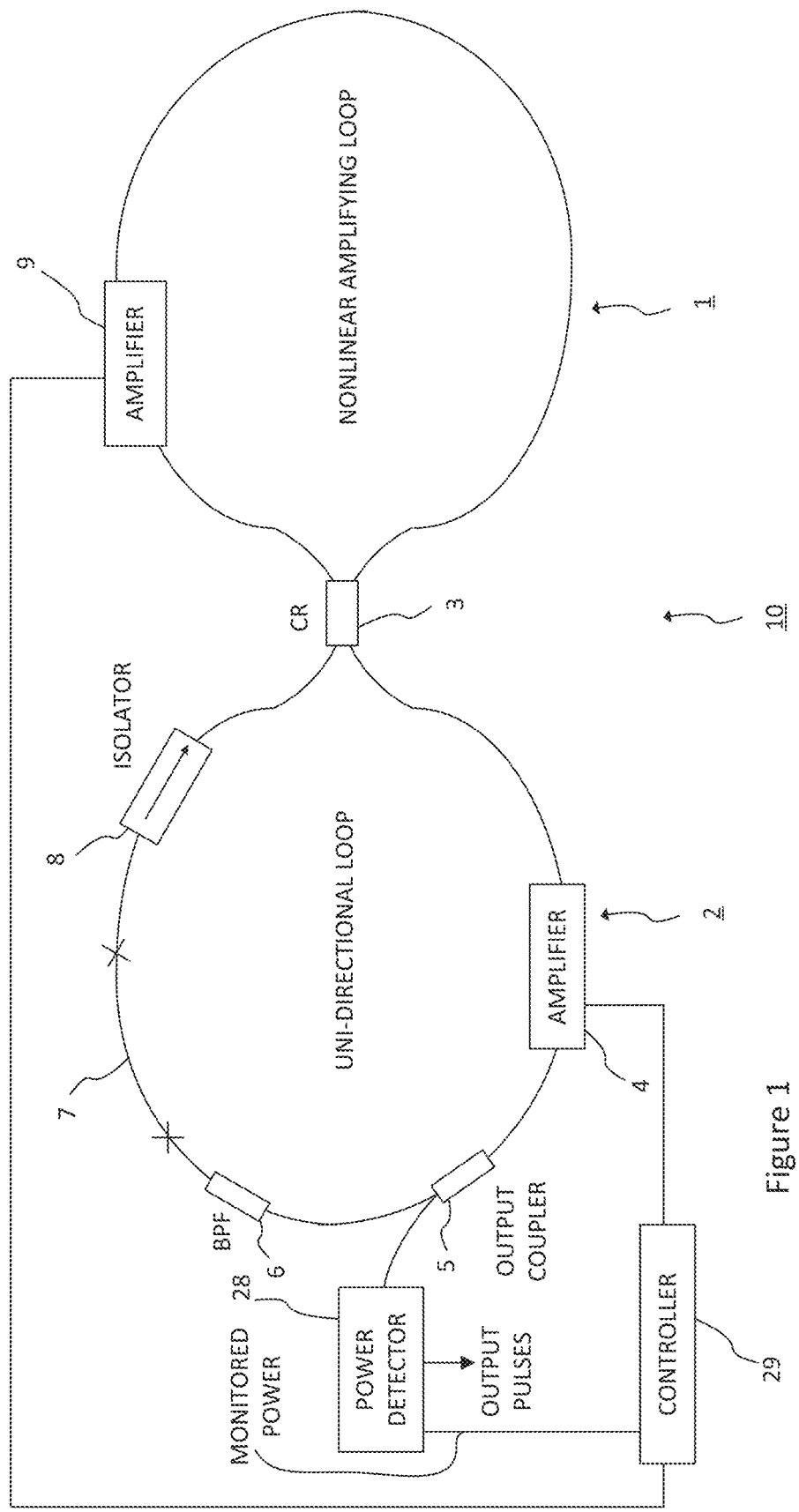
FIG. 1 is schematic diagram of a figure-8 laser according to a first embodiment.

Referring to the drawings, FIG. 1 schematically illustrates an embodiment of a dispersion-managed mode-locked figure-8 fiber laser providing stretched pulses. The fiber laser is shown as including a nonlinear amplifying loop 1 and a uni-directional loop 2. A 2×2 central coupler 3 is included and utilized to create pathways between loops 1 and 2.

Uni-directional loop 2 is shown as including an amplifier 4. The amplifier compensates for losses experienced by the pulses propagating in the laser cavity. Amplifier 4 can be a semiconductor-based or fiber-based optical amplifier. An output coupler 5 is connected to the output end of amplifier 4 which couples out a portion of the optical power circulating in the laser cavity. A portion of the output power is photodetected at detector 28 and used to form the feedback loop required to control the output pulse parameters of the laser. Power can alternatively be measured at a location separate from the output. A spectral bandpass filter (BPF) 6 is placed after the output coupler which re-shapes the pulses propagating in the cavity and determines the central wavelength of the laser. An optical fiber 7 can be placed in the loop, preferably after BPF 6, to manage the net dispersion of the laser cavity. If optical fiber 7 is not used in the loop, the laser 10 will be an all normal-dispersion fiber laser and not a dispersion-managed fiber laser. Optical fiber 7 has an opposite group velocity dispersion magnitude with respect to the dispersion of the other cavity fibers. Components 5, 6, and 7 can be placed either before or after amplifier 4. An optical isolator 8 can be located at the output of fiber 7 which ensures a uni-directional operation and blocks pulses propagating in the opposite direction.

The nonlinear amplifying loop 1 is shown as including an amplifier 9. The remainder of nonlinear amplifying loop 1 can be formed of normal-dispersion fiber. This fiber loop converts continuous radiation to pulsed radiation and is responsible for the start of the mode-locking mechanism.

Figure 2:
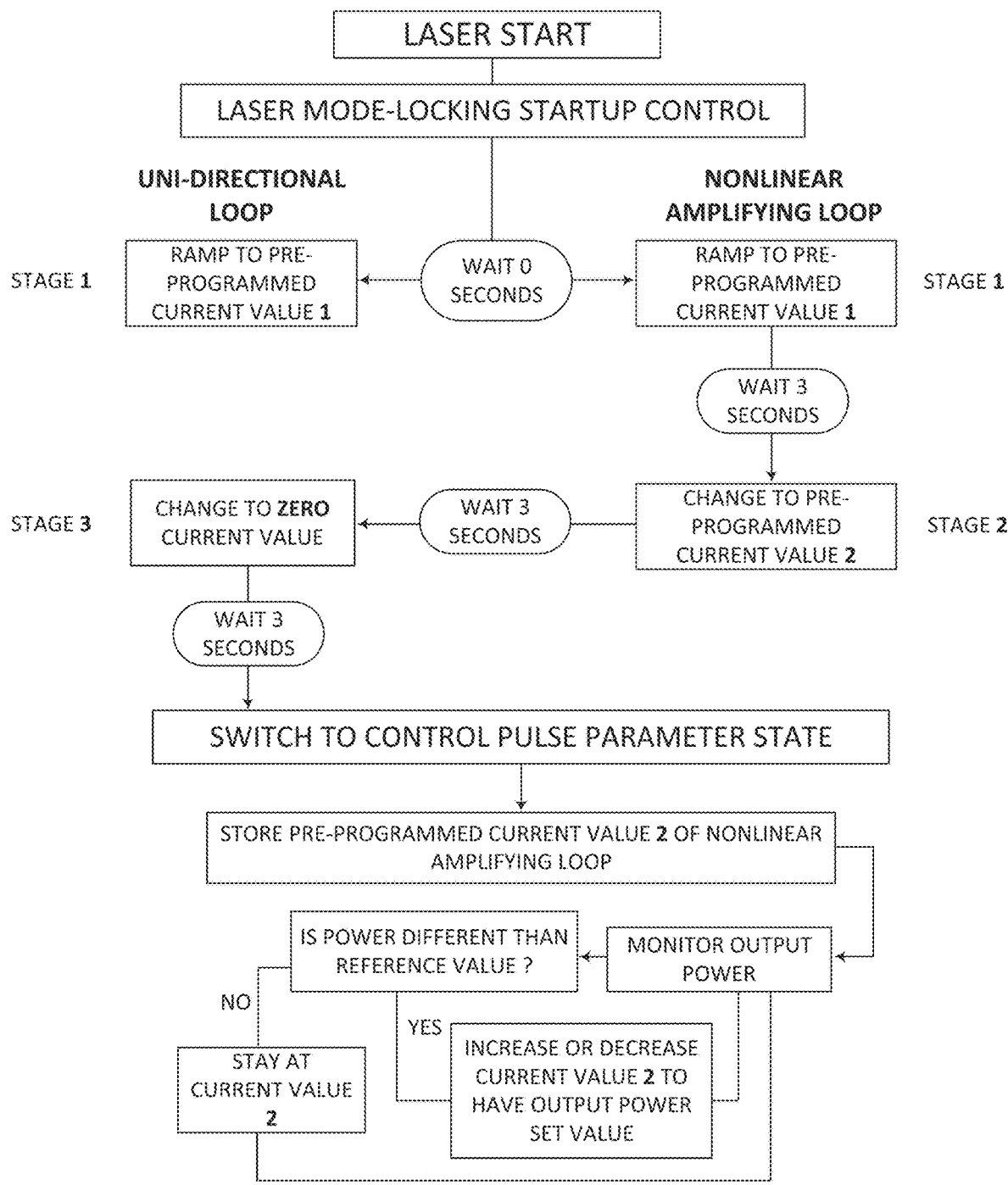
FIG. 2 is sequence diagram of the laser mode-locking start-up control according to an embodiment.

The novel method used to reliably initiate the laser mode-locking and control the output pulse parameters of this laser is shown in FIG. 2. The controller 29 has the ability to control the drive current of amplifiers 4 and 9 in the uni-directional loop and the nonlinear amplifying loop, respectively. To initiate the mode-locking mechanism, the controller 29 does not need to use any monitors to control the operating parameters. The reason for not needing any monitors at the laser start-up state is that the laser mode-locking mechanism is not greatly sensitive to the gain of both amplifiers 4 and 9. There is a wide range of gain values at which laser can self-start. Adding monitors is possible, but would only add control-complexity and time for the laser to start. Instead, the current drivers of both amplifiers can be changed according to preprogrammed current values.

The controller 29 can be any suitable processor (e.g. microcontroller, computer) running suitable software, or it can be implemented using circuitry such as a programmable logic controller (PLC), FPGA or hard-wired analog and/or digital circuitry.

For example, when the oscillator is started, the controller 29 can cause both current drivers to be ramped up—at the same time—to their respective preprogrammed start current values 1 as shown in stage 1 of FIG. 2. The drive current value of amplifiers 4 and 9 may not be necessarily the same. A delay between starting the current driver of each amplifier can also be added. In the following stages, the controller changes the drive current of both amplifiers in a sequence following the arrows illustrated in FIG. 2. The waiting time between stages may also be different than the illustrated waiting time of 3 seconds. If the start-up state consists of only 3 stages as shown in FIG. 2 (can be up to N stages if required based on laser design), the drive current value 2 (or stage N−1) of amplifier 9 is important in order to have the drive current of amplifier 4 turned off in stage 3 (or stage N) and still obtain stable single pulse operation. If the drive current value 2 of amplifier 9 is too high in stage 2, the laser may remain operating in a multi-pulse regime after the drive current of amplifier 4 is turned off in stage 3. If current value 2 of amplifier 9 is too low, the laser could fail to operate in stable single-pulse operation after the drive current of amplifier 4 is turned off in stage 3 and CW radiation only would circulate in the cavity.

After finishing the start-up stages, the controller waits 3 seconds, for example, before it starts monitoring the output power, for example using a photodiode. This power is compared to a predetermined reference value and the pump power of the amplifier of the nonlinear amplifying loop is increased or decreased if the power is different from the reference value. This way, the laser produces output pulses that are stable (power, bandwidth, duration) against environmental changing conditions as will be discussed below.

Figure 3:
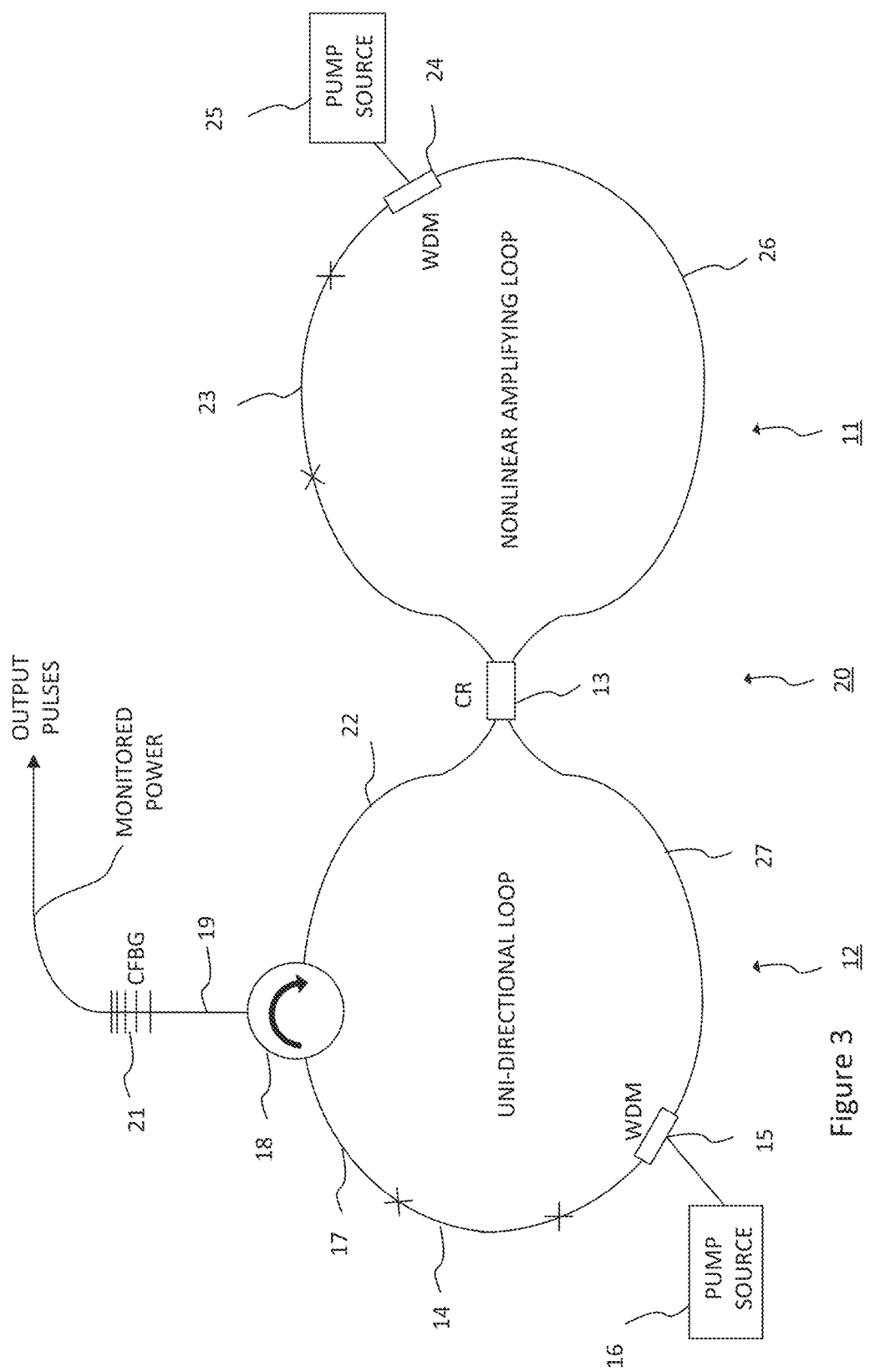
FIG. 3 is schematic diagram of a figure-8 laser according to a second embodiment.

FIG. 3 schematically illustrates another embodiment of a dispersion-managed mode-locked figure-8 fiber laser providing stretched pulses. The fiber laser is shown as including a uni-directional loop 12 and a nonlinear amplifying loop 11. A 2×2 central coupler 13 is included and utilized to create pathways between loops 11 and 12. All fibers and components in this figure-8 fiber laser embodiment are polarization maintaining. The all-PM architecture helps ensure that the laser produces pulses that are stable against environmental changing conditions when the power control feedback loop is active.

Uni-directional loop 12 is shown as including a section of rare-earth-doped gain fiber 14, with optical pump light 16 introduced into gain fiber 14 via a wavelength division multiplexer (WDM) 15. Ytterbium is typically utilized as the rare-earth dopant for gain fiber, where pump light at a wavelength of 976 nm is known to provide the inversion required for introducing gain for an optical signal propagating through the gain fiber. However, gain fiber 14 may utilize other rare-earth dopants (including, Er, Tm, Ho), where each provides gain over a different optical wavelength region, and thus produces output pulses at different wavelengths.

An optical circulator 18 is located at the output of gain fiber 14 which ensures a uni-directional operation and blocks pulses propagating in the opposite direction. A chirped fiber Bragg grating (CFBG) 21 is connected to port 2 of circulator 18 and is used to control the net dispersion of the cavity and also acts as a spectral bandpass filter. The dispersion of CFBG 21 is one operating parameter that may be controlled based on the length of the laser cavity to maintain the net dispersion within a defined range. At the output end of the CFBG, a portion of output power may be photodetected and used to form the feedback loop required to control the output pulse parameters of the laser. As mentioned above, the location of photodetection for feedback purposes can be elsewhere in the laser, although it is convenient to locate it at the output. Maintaining the lengths of fibers 17, 19, 22 and 27 within a defined range as discussed below are design parameters that may be controlled to provide self-starting ending in stable single-pulse operation.

The nonlinear amplifying loop 11 is shown as including a section of rare-earth-doped gain fiber 23, with optical pump light 25 introduced into gain fiber 23 via a WDM 24. The length of fiber 26 is one design parameter that may be controlled to provide self-starting operation.

In one example of the dispersion-managed figure-8 fiber laser, laser 20 is an ytterbium-doped fiber-oscillator which delivers pulses at a wavelength of about 1030 nm±1 nm. The laser delivers output pulses having a FWHM duration of about 2.4 ps at a repetition rate of about 25 MHz. The pulses have a FWHM spectral bandwidth of about 14.7 nm. The average output power of the pulse train is about 7.9 mW. Preferably, the laser is configured to achieve a repetition rate above about 5 MHz (more preferably above about 10 MHz) and a pulse duration shorter than about 15 ps with a FWHM spectral bandwidth larger than about 7 nm and an average power above 1 mW. The CR 13 has a 60/40 coupling ratio. As will be appreciated by a person skilled in the art, this coupling ratio can vary from the exemplary 60/40 ratio, although 60/40 is more efficient than 50/50 or than 80/20. The length of gain fiber 14 can be about 0.5 m. Circulator 18 is a low-loss circulator with a total insertion loss of 1 dB. This circulator is used to reduce the total loss in the cavity.

The loss of the circulator is one operating parameter that may be controlled to provide self-starting operation. The loss is preferred to be less than 2 dB. CFBG 21 has an anomalous dispersion of D2=0.42 ps/nm and a reflection ratio of 0.37. The length of fiber 17 can be about 0.4 m, the length of fiber 19 can be about 0.6 m, the length of fiber 22 can be about 1.8 m, the length of fiber 27 can be about 0.5 m, the length of gain fiber 23 can be about 0.5 m, and the length of fiber 26 can be about 1.5 m.

It has been found that—for a given layout of nonlinear amplifying loop and CR—there is a set of operating parameters in the uni-directional loop that will reliably provide self-starting of the figure-8 fiber laser ending in a stable single-pulse operational regime. As mentioned above, CFBG 21 acts as a spectral bandpass filter. The spectral bandwidth of CFBG 21 has been found to affect the self-starting of the fiber laser. A relatively narrow bandwidth of CFBG 21 increases the loss in the cavity and thus only CW radiation circulates in the laser cavity. The minimum acceptable bandwidth has been found to be in the range of 7 nm. To obtain stretched pulses from the laser, the dispersion of the CFBG 21 is controlled such that the net cavity dispersion is in the range from $-0.16$ ps$^2$ to $+0.15$ ps$^2$.

In accordance with the present invention, the lengths of fibers 17, 19, 22, and 27 are parameters that may be controlled to promote the desired self-starting behavior of the figure-8 laser cavity. The length of each of these fibers may be adjusted to modify the amount of dispersion and nonlinearity contributed by this section. It has been found that for a fiber 17 in the length range from 0.1 to 2 m the laser could self-start into a stable stretched pulse regime. When the laser operates in the single-pulse regime, pump source 16 could be turned off and only pump source 25 needs to remain operating. However, if the length of fiber 17 is chosen longer than 2 m, the laser could self-start into a stable stretched pulse regime but the two pump sources 16 and 25 need to remain operating in the single-pulse regime. In addition, fiber 19 has to be of length longer than 0.35 m to have a reliable self-start. Fiber 19 can be as long as 7 m depending on the desired repetition rate for this laser. It has been found that for a fiber 22 in the length range between 1.5 to 3.5 m, the laser could self-start into a stable stretched pulse regime. Suitable lengths of fiber 22 depend on its mode-field diameter and the laser wavelength. For lengths longer than 3.5 m, the laser does not self-start and only CW radiation circulates in the cavity. For lengths shorter than 1.5 m, the laser operates only in multi-pulse operation regime and does not provide a single-pulse operation. It has also been found that for a fiber 27 length in the range between 0.5 m and 1.5 m, the laser reliably self-starts. For lengths longer than 2 m, the laser cannot self-start. The lengths provided herein are given as an example and are suitable for operation at a wavelength in the 1 micron region, within the gain bandwidth of Yb. For different wavelengths, the lengths may need to be adjusted. As will be appreciated by a person skilled in the art, the length of fibers 17, 19, 22 and 27 could be different than the above-mentioned values if special fibers (high or low nonlinearity PM fibers) were used instead of standard PM optical fibers. However, it is preferred that the following condition is satisfied: $(\gamma \times L)_{special\ fiber} = (\gamma \times L)_{used\ fiber}$, where $\gamma$ is the waveguide nonlinearity and L is length of the fiber.

The length of gain fiber 14 is another one of the parameters that may be controlled to promote the desired self-starting behavior of the figure-8 laser cavity. The length of fiber 14 may be adjusted to modify the amount of dispersion and nonlinearity contributed by this section. It has been found that for a fiber length in the range from 0.3 to 0.7 m the laser could self-start into a stable single-pulse regime, preferably providing stretched pulses. For lengths shorter than 0.3 m, the laser does not self-start and only CW radiation circulates in the cavity. For lengths longer than 0.7 m, the laser operates only in a multi-pulse operation regime and does not provide single-pulse operation. Having the gain fiber 14 within the specified length range, it has been found that, during operation in a single-pulse regime, pump 16 could be kept on at a carefully controlled level or, advantageously, turned off, thereby simplifying control of the laser output pulse parameters.

Additionally, it has been found that, the initial optical power level of pump source 16 and pump source 25 and the sequence of reducing the optical power level of pump source 16 and pump source 25 are other parameters that provide the desired self-starting behaviour of the figure-8 fiber laser. It has been found that, for this example, starting first pump source 25 with pump power in the range of about 350-450 mW and then starting pump source 16 with pump power in the range of about 170-270 mW, the laser will provide self-starting of the figure-8 laser cavity into a high-order multi-bound stretched pulse (more than six-bound states) operational regime. Starting the laser above the power threshold level for a single-pulse operational regime has been found essential in order to have a robust self-starting under different environmental conditions. In the second stage of this sequence, pump source 16 is maintained at the same power level as in the previous stage and pump source 25 is reduced to a power in the range of about 160-220 mW. In this stage, the laser will switch to a low-order multi-bound (mostly dual- or triple-bound) pulse operational regime. In the third stage of this sequence, pump source 16 is turned off and pump source 25 is maintained at its previously set power level. In this stage, the laser will switch to a single-pulse operational regime. At this stage, having pump source 25 with power level lower than the range of 160-220 mW will result in losing the laser mode-locking and only amplified optical noise will be emitted at the output of the laser instead of optical pulses. Additionally, having the pump source 25 with power level higher than the range of 160-220 mW will result in sustaining the low-order multi-bound stretched pulse regime.

Figure 4:
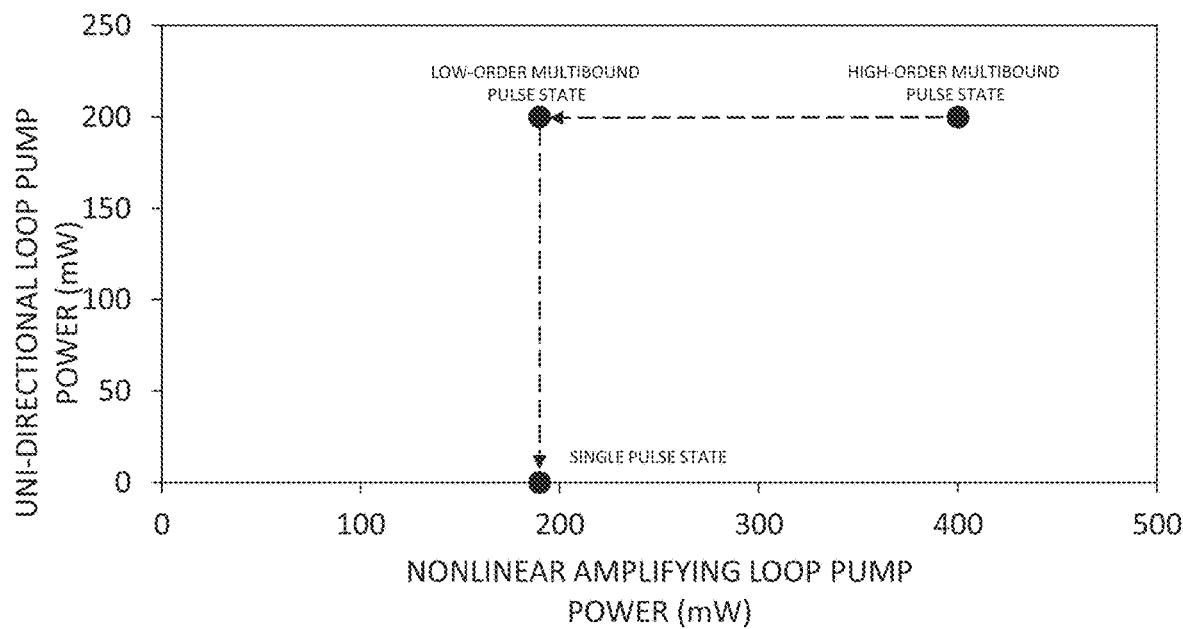
FIG. 4 is a graph showing the combination of pump powers at three different stages during start-up.

FIG. 4 is a graph showing an example of the sequential stages of pump power reduction of pump source 16 and pump source 25. It is emphasized here that the particular sequence described above should not be construed as limiting the present invention. Those skilled in the art, from the description provided herein may employ other pump power adjustment sequences. While a single-pulse operational regime could also be achieved while having both pumps operating, the figure-8 laser described herein advantageously has the ability to operate in the single-pulse regime with only the bidirectional loop amplifier being powered.

Figure 5:
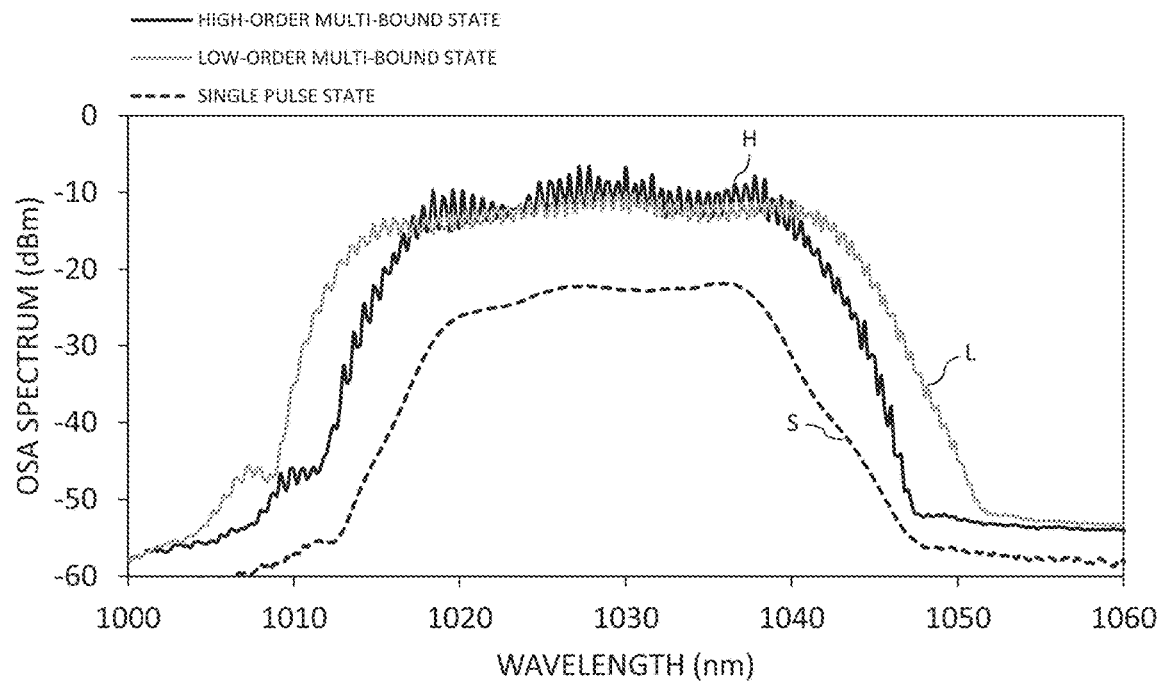
FIG. 5 is a graph showing the OSA spectrum in the three stages of FIG. 4.

FIG. 5 is a graph illustrating exemplary measured spectra of three different operational pulse regimes obtained from an experimental version of the apparatus of FIG. 3. These spectra were generated at the three pump power reduction stages discussed above and shown in FIG. 4. The first pulse regime, identified as graph H in FIG. 5, is associated with both pump power levels higher than required for a stable single-pulse regime. The high pumping power in the fiber laser cavity allows the generation of the high-order multi-bound pulses, yet the amplified spontaneous emission (ASE) noise is also enhanced under strong pumping in the Ytterbium fiber amplifiers. At high pump power levels, the ASE is sufficient to affect the phase locking between adjacent bound pulses. The variation in relative phase locking influences the interaction of adjacent pulses which causes the spectrum to be weakly modulated as shown in Graph H of FIG. 5.

Figures 6A, 6B, 6C:
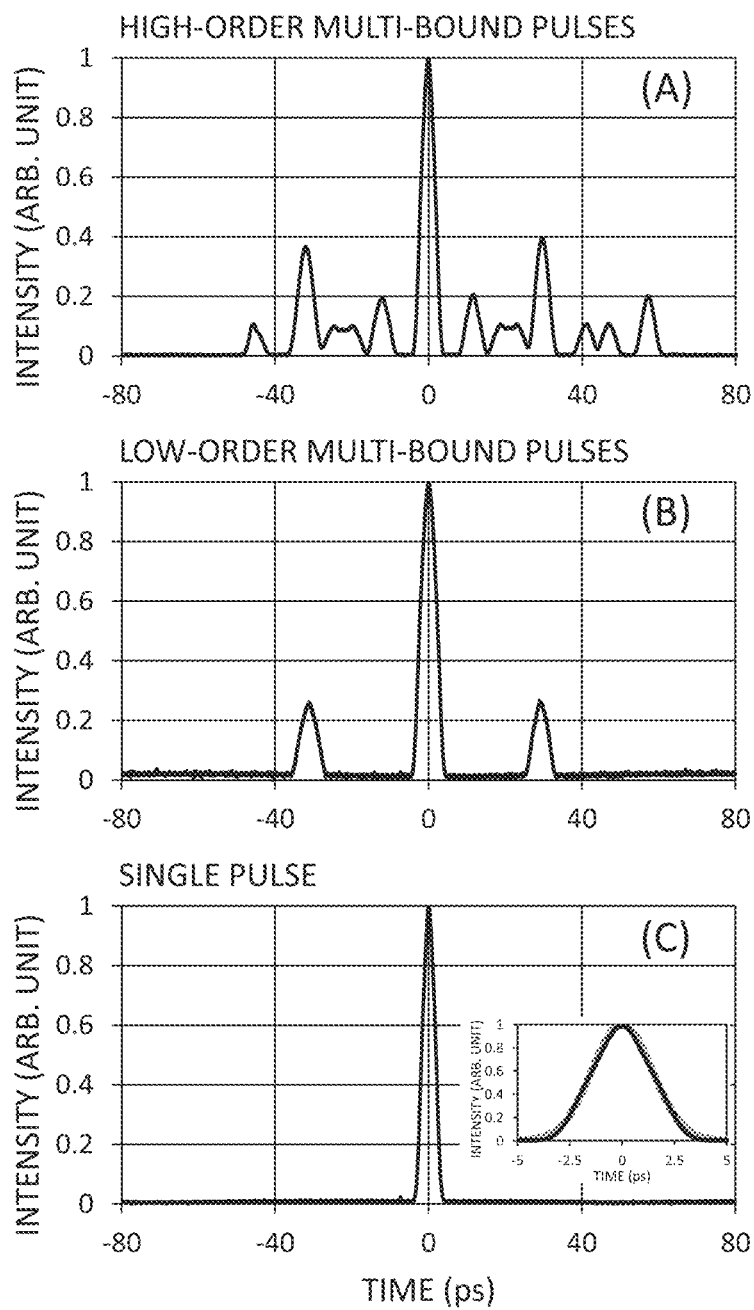
FIGS. 6A through 6C show the pulse intensity temporal shape for the three stages of FIG. 4, respectively.
Figures 7A, 7B, 7C:
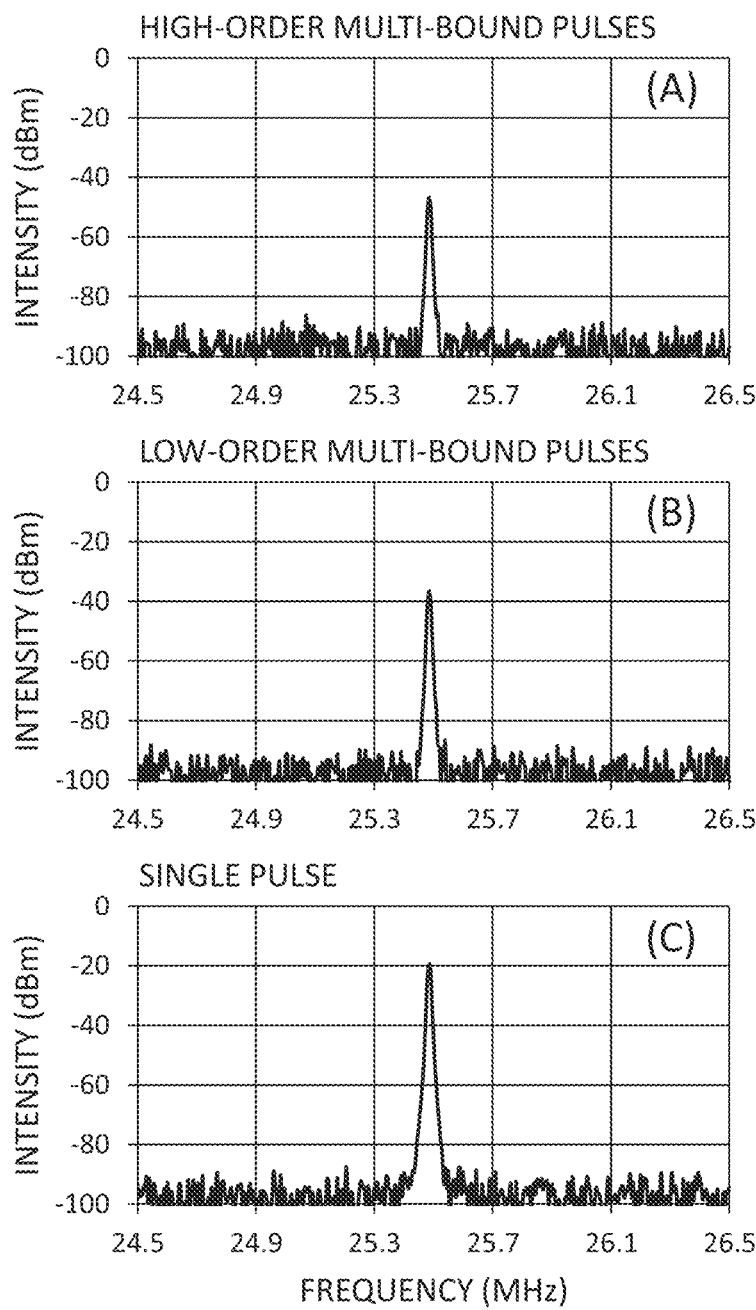
FIGS. 7A through 7C show the pulse spectral shape for the three stages of FIG. 4, respectively.

FIG. 6(A) is a graph of autocorrelation trace of the pulse structure generated at the pumping power levels associated with graph H of FIG. 5. The graph reveals the presence of closely separated eight-bound pulses (tight bounds) involved in the generation of the spectrum. FIG. 7(A) shows the corresponding RF spectrum of the high-order multi-bound pulses. The results reveal that the signal-to-noise ratio is 45 dB which shows that there are pulse fluctuations in this state or that they are highly sensitive to the environmental conditions.

Graph L in FIG. 5 and FIG. 6(B) illustrates the measured spectrum and autocorrelation trace of a low-order multi-bound pulse operation regime provided by the figure-8 fiber laser at the pumping power level associated with graph L of FIG. 5. The pulse structure can be inferred from the autocorrelation trace, which reveals the presence of tightly two-pulse bound states 30 ps apart from each other (the ratio of the pulse separation to the pulse width is 10). Other pulse separation to pulse width ratios (for example 1.5 and 5) were also observed at this pump level during different self-starts. The overlap of these bound states during cavity circulation modulates the spectrum as shown in FIG. 5 with the shape depending on the phase difference between pulses. The RF spectrum shown in FIG. 7(B) shows that in the low-order multi-bound pulse operation regime the signal-to-noise ratio increases to 55 dB.

Graph S in FIG. 5 and FIG. 6(C) illustrate the measured spectrum and autocorrelation trace of a single-pulse operation regime provided by the figure-8 fiber laser while operating only pump 25 of the nonlinear amplifying loop. The inset of FIG. 6(C) shows that the autocorrelation trace is well fitted by a Gaussian profile with a 2.4 ps pulse duration. This pulse regime is stable and reproducible. The RF spectrum shown in FIG. 7(C) shows that in the single pulse operation regime the signal-to-noise ratio increases to 70 dB.

For the embodiment of FIG. 3, the graphs in FIG. 8 show the measured percentage change of the figure-8 fiber laser output power (square symbols), the output pulse spectral bandwidth (circle symbols) and the output pulse temporal duration (triangle symbols) while changing the power of the pump source 25 of the optical amplifier in the non-linear amplifying loop during operation in the single pulse regime. The graph shows that the output power of the laser is affected more by the change of the pump source 25 power than the spectral bandwidth and the pulse duration. Therefore, actively stabilizing the output power of the laser (i.e. implementing an Automatic Power Control loop), which may otherwise vary with temperature, would lead to simultaneous control of the figure-8 fiber laser pulse parameters. Controlling the output power could be achieved by forming a closed feedback loop where the output power (as measured by detector 28 with reference to FIG. 1) is monitored and the pump source driver current (for amplifier 9, while amplifier 4 is essentially off) is electronically controlled (by controller 29) based on the change of the output power. Given that the relationship between pulse characteristic and output power as shown in FIG. 8 being a property of the laser that does not vary with temperature, it will be understood that controller 29 can have a pulse characteristic selection input and controller 29 can control the output power to match the corresponding output power for the selected pulse characteristic. The controller can comprise a processor and memory storing a relation between pulse characteristics and output power.

Figure 9:
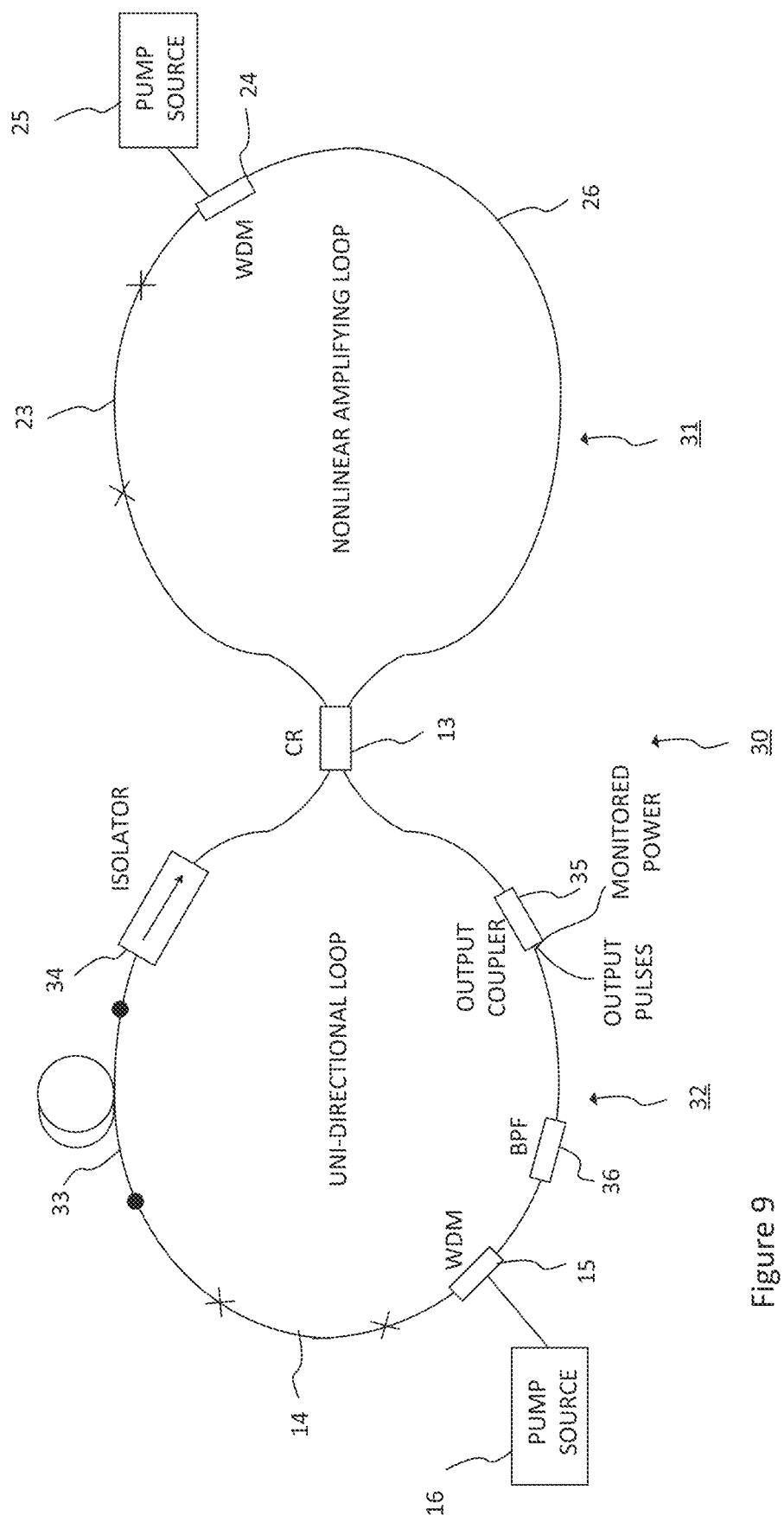
FIG. 9 is schematic diagram of a figure-8 laser according to a third embodiment.

FIG. 9 schematically illustrates an embodiment of an all-normal dispersion mode-locked figure-8 fiber laser providing stable pulse operation. The fiber laser, with the use of the control method, operates using a single amplifier in the stable single-pulse regime. The fiber laser is shown as including a nonlinear amplifying loop 31 and a uni-directional loop 32. A 2×2 central coupler 13 is included and utilized to create pathways between loops 31 and 32.

The nonlinear amplifying loop 31 has the same structure as the nonlinear amplifying loop 11 of FIG. 3. Uni-directional loop 32 is shown as including a section of rare-earth-doped gain fiber 14, with optical pump light 16 introduced into gain fiber 14 via a WDM 15. An optical fiber 33 which has the same dispersion characteristics as the fibers of the laser cavity is located at the output of gain fiber 14. An optical isolator 34 which ensures a uni-directional operation and blocks pulses propagating in the opposite direction is placed at output of fiber 33. An output coupler 35 couples out a portion of the optical power circulating in the laser cavity. A portion of the output power is photodetected and used to form the feedback loop required to control the output pulse parameters of the laser. Power can alternatively be measured at a location separate from the output. A BPF 36 is placed after the output coupler which re-shapes the pulses propagating in the cavity and determines the central wavelength of the laser. The BPF 36 can also be removed from the cavity and the laser can remain operating.

In one example of an all-normal, all PM figure-8 fiber laser, laser 30 is an ytterbium-doped fiber oscillator which delivers pulses at a wavelength of about 1030 nm±1 nm. The laser delivers output pulses having a FWHM duration of about 15 ps at a repetition rate of about 8 MHz. The pulses have a FWHM spectral bandwidth of about 3.4 nm with a signal-to-noise ratio of 50 dB. Preferably, the laser is configured to achieve a repetition rate above about 5 MHz (more preferably above 10 MHz) and a pulse duration longer than about 10 ps with a FWHM spectral bandwidth larger than about 3 nm and an average power above 1 mW. The CR 13 has a 60/40 coupling ratio. As will be appreciated by a person skilled in the art, this coupling ratio can vary from the exemplary 60/40 ratio, although 60/40 is more efficient than 50/50 or than 80/20. The length of gain fiber 14 can be 0.5 m. Isolator 34 can be a low-loss isolator with a maximum insertion loss of 1 dB. This isolator ensures uni-directional propagation in the loop 32. The bandwidth of BPF can be 11 nm. The output coupler 35 can have an 80/20 coupling ratio, i.e. 20% of the light is coupled out of the cavity while 80% continues on to propagate in the cavity. It was found that the laser could operate in a stable single-pulse mode with a single amplifier (i.e. without gain fiber 14 being pumped) only if the output coupler 35 directs 80% or more of the light to remain in the cavity. However, the laser can operate with two amplifiers if greater than 20% is coupled out of the cavity. The length of optical fiber 33 can be 13 m. The length of fiber 26 can be 1.5 m, and the length of gain fiber 23 can be 0.5 m.

It has been found that, for this example, starting first pump source 25 with pump power in the range of about 400-530 mW and then starting pump source 16 with pump power in the range of about 80-140 mW, the figure-8 laser cavity will self-start in a multi-pulse operational regime. In the second stage of this sequence, pump source 16 is maintained at the same power level as in the previous stage and pump source 25 is reduced to a power range of 350-450 mW. In the third stage, pump source 16 is turned off and pump source 25 is maintained at the same power level as in the previous stage. In this stage, the laser will switch to a single-pulse operational regime. At this stage, having pump source 25 with a power level lower than the range of 350-450 mW will result in losing the laser mode-locking and amplified optical noise will be emitted at the output of the laser instead of optical pulses.

It was found that with the all-normal dispersion figure-8 fiber laser—compared to dispersion-managed figure-8 fiber laser—it is more challenging to obtain relatively short picosecond optical pulses (less than 15 ps) with a high degree of coherence. In many cases, as pump power 25 is adjusted, the measured autocorrelation trace shows a broad background plus a narrow spike (called a coherent artifact) that is much shorter than the actual pulse. This case is never observed in dispersion-managed figure-8 fiber lasers as long as the net dispersion of the cavity is within the previously specified range from −0.16 $ps^2$ to +0.15 $ps^2$. If the net dispersion is outside this range, for example 0.34 $ps^2$, the same autocorrelation traces could be observed as for the case of all-normal dispersion fiber lasers.

What is claimed is:

1. A mode-locked, figure-eight fiber laser comprising:
a fused fiber coupler for connecting two fiber loops;
a bi-directional loop connected to said coupler having a gain element and a first pump source;
a unidirectional loop connected to said coupler having a gain element, a second pump source, an isolator, a filter and an output coupler;
wherein said laser is operable to provide a stable single-pulse state of operation with said second pump source at zero power, and
wherein said laser is inoperable to start a high-order multi-pulse state of operation when only one of said first pump source and said second pump source is powered, and said laser is operable to start a high-order multi-pulse state of operation when both said first pump source and said second pump source are powered.

2. The laser as defined in claim 1, further comprising a controller connected to said first pump source and to said second pump source configured to drive both said first pump source and said second pump source at a high power to start a high-order multi-pulse state operation, then to drive said first pump source at a lower power to transition to a low-order multi-pulse state operation, and then to drive said second pump source at zero power to transition to said stable single-pulse state of operation.

3. The laser as defined in claim 1, wherein said uni-directional loop and said bi-directional loop comprise polarization maintaining fibers and polarization maintaining components.

4. The laser as defined in claim 1, wherein said laser comprises a length of optical fiber with opposite sign of group velocity dispersion with respect to other fiber in said laser for dispersion management, said single pulse state of operation providing, in use, stretched pulses.

5. The laser as defined in claim 1, wherein said isolator, said filter and said output coupler comprise an optical circulator and a chirped fiber Bragg grating.

6. The laser as defined in claim 1, wherein said gain element of said bi-directional loop comprises a section of rare-earth doped fiber.

7. The laser as defined in claim 6, wherein said section comprises Ytterbium doped fiber.

8. The laser as defined in claim 1, wherein said gain element of said uni-directional loop comprises a section of rare-earth doped fiber.

9. The laser as defined in claim 8, wherein said section comprises Ytterbium doped fiber.

10. The laser as defined in claim 1, wherein the net cavity group velocity dispersion is within the range of −0.16 $ps^2$ to +0.15 $ps^2$.

11. The laser as defined in claim 1, wherein the spectral bandwidth of the filter is at least 7 nm.

12. The laser as defined in claim 1, wherein said laser is configured to produce in said single-pulse state of operation output pulses having a full width, half maximum (FWHM) duration less than 15 ps.

13. The laser as defined in claim 2, wherein said controller is configured to change power levels of said first pump source and said second pump source in pre-determined increments with waiting times between subsequent increments as said power levels change from said high power to start a high-order multi-pulse state operation, then to drive said first pump source at a lower power to transition to a low-order multi-pulse state operation, and then to drive said second pump source at zero power to transition to a stable single-pulse state of operation.

14. The laser as defined in claim 2, wherein, once the laser has transitioned to a stable single-pulse state of operation, said controller is configured to drive said second pump source at fixed low levels of power so as to provide a greater range of output power, pulse duration, and spectral bandwidth from said laser.

15. The laser as defined in claim 14, wherein said controller is configured to have a pulse characteristic selection input, to translate said input into a desired output power level.

16. The laser as defined in claim 1, wherein said laser is configured to produce in said single-pulse state of operation output pulses having a repetition rate higher than 5 MHz.

17. The laser as defined in claim 1, wherein said laser is configured to produce in said single-pulse state of operation output pulses having a FWHM spectral bandwidth larger than about 1 nm.

18. The laser as defined in claim 1, wherein said laser is configured to produce in said single-pulse state of operation output pulses having an average output power above 1 mW.

19. A method for producing a stable train of laser pulses comprising:
providing a figure-8 laser having:
a fused fiber coupler for connecting two fiber loops;
a bi-directional loop connected to said coupler having a gain element and a first pump source; and
a unidirectional loop connected to said coupler having a gain element, a second pump source, an isolator, a filter and an output coupler;
driving both said first pump source and said second pump source at a high power to start a high-order multi-pulse state operation;
driving said first pump source at a lower power to transition to a low-order multi-pulse state operation; and
driving said second pump source at zero power to transition to a stable a single-pulse state of operation.

20. A method for producing a stable train of laser pulses comprising:
providing a mode-locked, figure-8 fiber laser having:
a fused fiber coupler for connecting two fiber loops;
a bi-directional loop connected to said coupler having a gain element and a first pump source; and
a unidirectional loop connected to said coupler having a gain element, a second pump source, an isolator, a filter and an output coupler;
wherein said laser is operable to provide a stable single-pulse state of operation with said second pump source at zero power;
driving both said first pump source and said second pump source at a high power to start a high-order multi-pulse state operation;
driving said first pump source at a lower power to transition to a low-order multi-pulse state operation; and
driving said second pump source at zero power to transition to a stable a single-pulse state of operation.

21. The method of claim 19, further comprising driving at least one pump to at least one intermediary-order multi-pulse or single-pulse state of operation.

22. The method of claim 19, further comprising increasing the power of the first pump source during single-pulse state of operation to increase the power of pulses.

23. The method of claim 19, further comprising creating stretched pulses during said single pulse state of operation using a length of optical fiber in said laser.

24. The method of claim 19, further comprising controlling the net dispersion of the cavity and filtering certain wavelengths of light using a chirped fiber Bragg grating.

25. The method of claim 19, further comprising introducing gain for optical signal propagation through a rare-earth-doped gain fiber.

26. The method of claim 19, wherein driving both said first pump source and said second pump source at a high power to start a high-order multi-pulse state operation involves changing the power levels of said pumps in pre-determined increments with waiting times between subsequent increments as said power levels change from said high power to start a high-order multi-pulse state operation.

27. The method of claim 19, further comprising, once the laser has transitioned to a stable single-pulse state of operation, driving said second pump at fixed low levels of power so as to provide a greater range of output power, pulse duration, and spectral bandwidth from said laser.

28. The method of claim 27, further comprising receiving, at a controller, a pulse characteristic selection input and translating said input into a desired output power level.

29. The method of claim 19, wherein the output pulses in said single-pulse state of operation have a full width, half maximum duration less than 15 ps.

30. The method of claim 19, wherein the pulses emitted in said single-pulse state of operation have a repetition rate higher than 5 MHz.

31. The method of claim 19, wherein the pulses emitted in said single-pulse state of operation have a full width, half maximum spectral bandwidth larger than about 1 nm.

32. The method of claim 19, wherein the pulses emitted in said single-pulse state of operation have an average output power above 1 mW.

* * * * *

UNITED STATES PATENT AND TRADEMARK OFFICE
CERTIFICATE OF CORRECTION

PATENT NO. : 11,482,827 B2
APPLICATION NO. : 17/560450
DATED : October 25, 2022
INVENTOR(S) : Alaa Al-Kadry It is certified that error appears in the above-identified patent and that said Letters Patent is hereby corrected as shown below:

In the Specification

1. In Column 3, Line 22, delete "pumps" and insert -- pump --, therefor.

2. In Column 8, Line 47, after "in" insert -- a --.

3. In Column 9, Line 17, delete "behaviour" and insert -- behavior --, therefor.

Signed and Sealed this
Twenty-first Day of March, 2023

*Katherine Kelly Vidal*

Katherine Kelly Vidal
*Director of the United States Patent and Trademark Office*